M. LAWLER.
Feed-Regulater for Calender-Rolls.
No. 134,810.                                    Patented Jan. 14, 1873.
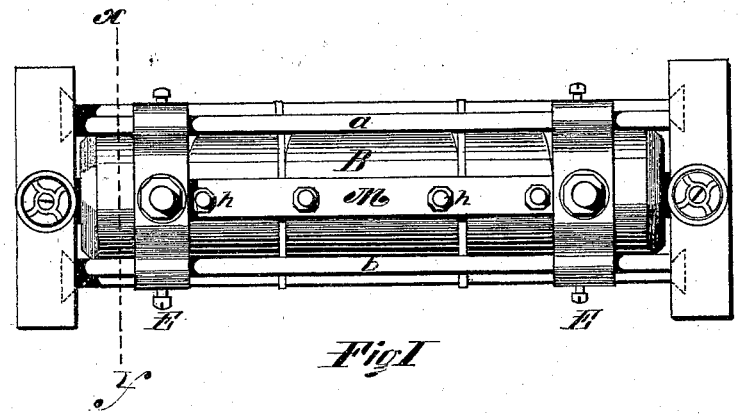
Fig I
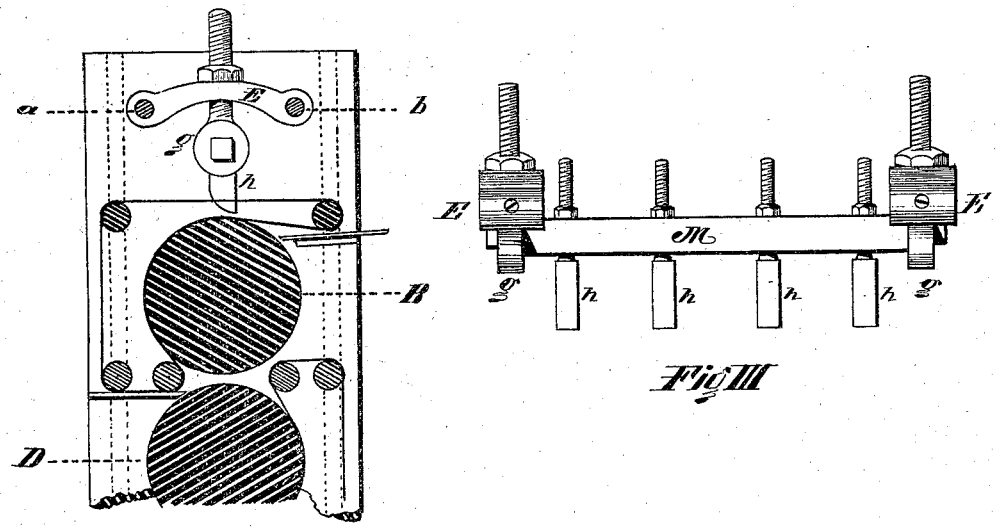
Fig II                    Fig III
Witnesses.                    Inventor:

UNITED STATES PATENT OFFICE.

MARTIN LAWLER, OF HOLYOKE, ASSIGNOR OF ONE-HALF HIS RIGHT TO OSCAR S. GREENLEAF, OF SPRINGFIELD, MASSACHUSETTS.

IMPROVEMENT IN FEED-REGULATORS FOR CALENDER-ROLLS.

Specification forming part of Letters Patent No. 134,810, dated January 14, 1873.

*To all whom it may concern:*

Be it known that I, MARTIN LAWLER, of Holyoke, Hampden county, State of Massachusetts, have invented an Improved Device for Regulating the "Feed-Regulator for Calender-Rolls," of which the following is a specification:

My device consists of an adjustable bar supported over the top or feed roll of a calender-frame, and holding a series of teeth, themselves adjustable in the bar, in such proximity to the surface of the roll that an undue excess of paper or other material will be prevented from passing through the rolls, the object of my invention being to preserve the frame and rolls from destructive pressure incident to such excess.

In the drawing, Figure I is a top view of a machine embodying my improvement; Fig. II is a cross-section on the line $x\,y$; and Fig. III is a detached view.

Upon the bars $a\,b$ extending from end to end of the frame, and parallel to the axes of the rolls B D, are sleeved the cross-heads E E, through which pass the screw ends of the supports $g\,g$ to bar M. Through bar M pass the teeth $h\,h\,h$, &c., as many as are desired, and the distance which these teeth, or any one of them, extends below the bar, is regulated by the nut on its screw-stem, as is also the adjustment of the bar M from the cross-heads regulated by the nuts upon the supports $g\,g$. The ends of bar M are rigidly held by the pieces $g\,g$, and the cross-heads with the bar may be moved upon the bars $a\,b$.

The teeth $h\,h\,h$, &c., I prefer to form to present a flat surface to the approaching paper, as shown in Fig. III. By this means I am able to keep the ends of the teeth at the required distance from the surface of the feed-roll of a train of calender-rolls having a large adjustment themselves within the frame.

In the calender-frames in use, by an inadvertence in feeding too much stock at once, the rolls are liable to be broken at their bearings in the frame, or the frames themselves broken, or the alternate paper rolls of the train injured or destroyed, while by my device the feed is stopped when too thick to pass under the teeth $h\,h\,h$, &c.

Now, having described my invention, what I claim is—

In combination with the feed-roll B of a calender-frame, the device for regulating the feed thereto, consisting of the adjustable bar M containing the adjustable teeth $h\,h\,h$, &c., and supported from the bars $a\,b$ by the adjustable cross-heads E E, substantially as shown and described.

MARTIN LAWLER.

Witnesses:
J. P. BUCKLAND,
D. O. LOWRY.